(12) United States Patent
Miller et al.

(10) Patent No.: US 8,602,059 B2
(45) Date of Patent: Dec. 10, 2013

(54) DIVERTER VALVE WITH HANDLE

(75) Inventors: Michael A. Miller, Portage, MI (US); Daniel S. Genord, South Lyon, MI (US); Dominic J. Daunter, Howell, MI (US); Julian Giggs, Hillsdale, MI (US)

(73) Assignee: Alsons Corporation, Hillsdale, MI (US)

( * ) Notice: Subject to any disclaimer, the term of this patent is extended or adjusted under 35 U.S.C. 154(b) by 0 days.

(21) Appl. No.: 13/292,670

(22) Filed: Nov. 9, 2011

(65) Prior Publication Data

US 2012/0055558 A1  Mar. 8, 2012

Related U.S. Application Data

(62) Division of application No. 12/051,008, filed on Mar. 19, 2008, now abandoned.

(51) Int. Cl.
*F16K 11/065* (2006.01)
(52) U.S. Cl.
USPC ......... 137/625.5; 137/867; 251/235; 251/297
(58) Field of Classification Search
USPC ............... 137/625.42, 625.44, 625.48, 625.5, 137/867, 875; 251/78, 231, 232, 235, 297
See application file for complete search history.

(56) References Cited

U.S. PATENT DOCUMENTS

| | | | |
|---|---|---|---|
| 1,666,243 A * | 4/1928 | Manning | 137/241 |
| 1,708,380 A | 4/1929 | Deacon | |
| 2,246,802 A | 6/1941 | Kehm | |
| 2,616,658 A * | 11/1952 | Dombeck | 137/625.5 |
| 2,684,691 A | 7/1954 | Strickler | |
| 2,757,688 A * | 8/1956 | Klingler | 137/625.44 |
| 2,852,947 A | 9/1958 | Klinger | |
| 3,402,642 A | 9/1968 | Hecke | |
| 3,661,182 A | 5/1972 | Loveless | |
| 3,695,291 A | 10/1972 | Sims | |
| 3,788,354 A | 1/1974 | Symmons | |
| 3,936,891 A | 2/1976 | Kulde | |
| 4,029,295 A | 6/1977 | Wassmer | |
| 4,393,523 A | 7/1983 | Nolden | |
| 4,674,526 A | 6/1987 | Athanassiu | |
| 4,718,457 A | 1/1988 | Luger | |
| 4,821,771 A | 4/1989 | Maxwell | |
| 4,878,514 A | 11/1989 | DeJong | |
| 5,188,149 A | 2/1993 | Williams | |
| 5,199,639 A | 4/1993 | Kobayashi et al. | |
| 5,261,275 A | 11/1993 | Davis | |
| 5,441,080 A | 8/1995 | Baumann | |
| 5,899,805 A | 5/1999 | Dowd | |
| 6,286,764 B1 | 9/2001 | Garvey et al. | |
| 6,354,518 B1 | 3/2002 | Gil et al. | |
| 6,425,958 B1 | 7/2002 | Giddings et al. | |

(Continued)

FOREIGN PATENT DOCUMENTS

| | | |
|---|---|---|
| CN | 2539029 | 3/2003 |
| CN | 101131215 | 2/2008 |
| DE | 957380 | 1/1957 |
| DE | 1140788 | 12/1962 |

OTHER PUBLICATIONS

Extended European Search Reported received Nov. 28, 2011.

*Primary Examiner* — John Fox
(74) *Attorney, Agent, or Firm* — Carlson, Gaskey & Olds P.C.

(57) ABSTRACT

A diverter valve assembly which eliminates rotational motion for actuation.

14 Claims, 5 Drawing Sheets

(56) References Cited

U.S. PATENT DOCUMENTS

| | | |
|---|---|---|
| 6,536,464 B1 | 3/2003 | Lum et al. |
| 6,626,420 B2 | 9/2003 | Amidzich |
| 6,635,134 B1 | 10/2003 | Lichtenberg et al. |
| 6,644,352 B1 | 11/2003 | Pfetzer |
| 6,738,996 B1 | 5/2004 | Malek et al. |
| 6,823,540 B2 | 11/2004 | Gunn |
| 6,929,187 B2 | 8/2005 | Kempf et al. |
| 7,000,854 B2 | 2/2006 | Malek et al. |
| 7,073,528 B2 | 7/2006 | Kempf et al. |
| 7,140,382 B2 | 11/2006 | Kempf et al. |
| 7,198,059 B2 | 4/2007 | Kempf et al. |
| 7,287,707 B2 | 10/2007 | Kempf et al. |

\* cited by examiner

DIVERTER VALVE WITH HANDLE

RELATED APPLICATION

This application is a divisional application of U.S. patent application Ser. No. 12/051,008, which was filed on Mar. 19, 2008 now abandoned.

BACKGROUND

The present invention relates to a diverter valve, and more particularly to a diverter valve for a shower and tub.

Diverter valves are often utilized to control water flow from a bathtub faucet or a shower head. Current diverter valves utilize a rotational cam device to divert the water flow. This may be undesirable as the rotational motion may wear seals within the diverter valve.

SUMMARY

A diverter valve assembly according to an exemplary aspect of the present invention includes: a valve body which defines an inlet, a first outlet and a second outlet; a rigid core; a resilient core mounted to the rigid core; and a handle core engaged with the rigid core, the handle core movable between a first position and a second position, the first position engages the resilient core with the valve body and blocks the second outlet to divert a fluid from the inlet to the first outlet, the second position engages the resilient core with the valve body and block the first outlet to divert the fluid from the inlet to the second outlet.

The diverter valve assembly eliminates the need for rotational motion to divert water by a push method which reduces seal wear. The diverter valve assembly is also relatively easier to operate as no rotation is required.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1A:
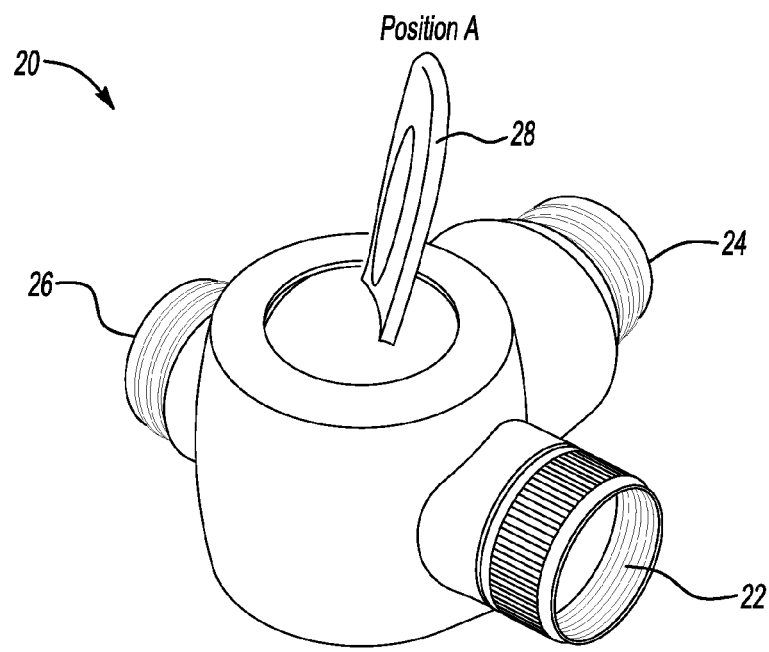
FIG. 1A is a perspective view of a diverter valve assembly in a first position.
Figure 1B:
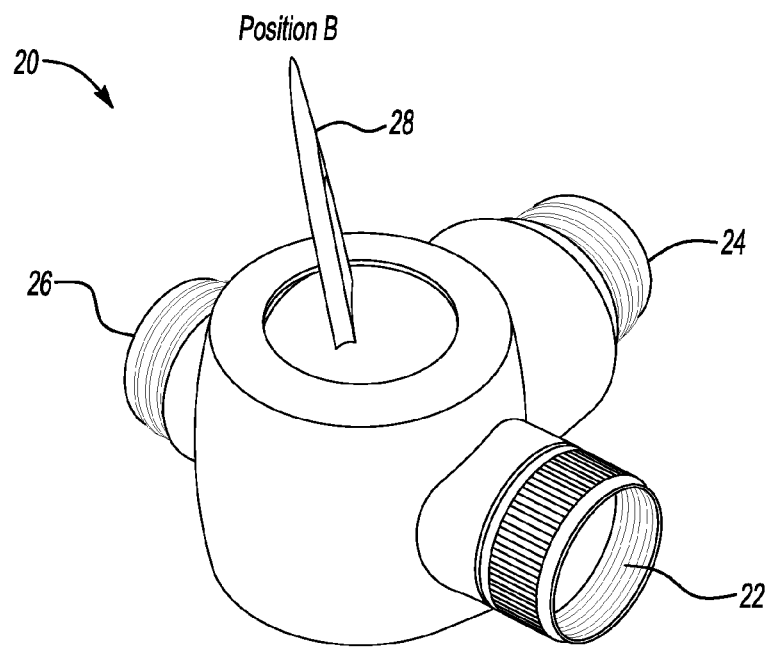
FIG. 1B is a perspective view of a diverter valve assembly in a second position.

FIG. 1A schematically illustrates a diverter valve assembly 20. The diverter valve assembly 20 generally includes an inlet 22 a first outlet 24, a second outlet 26 and a handle 28. The handle 28 is movable between a first position A to divert water from the inlet 22 to the first outlet 24 and a second position B to divert water from the inlet 22 to the second outlet 26 (FIG. 1B). The diverter valve assembly 20 eliminates the need for rotational motion which reduces seal wear. The diverter valve assembly 20 is also relatively easier to operate by this no rotation required switch method.

Figure 2:
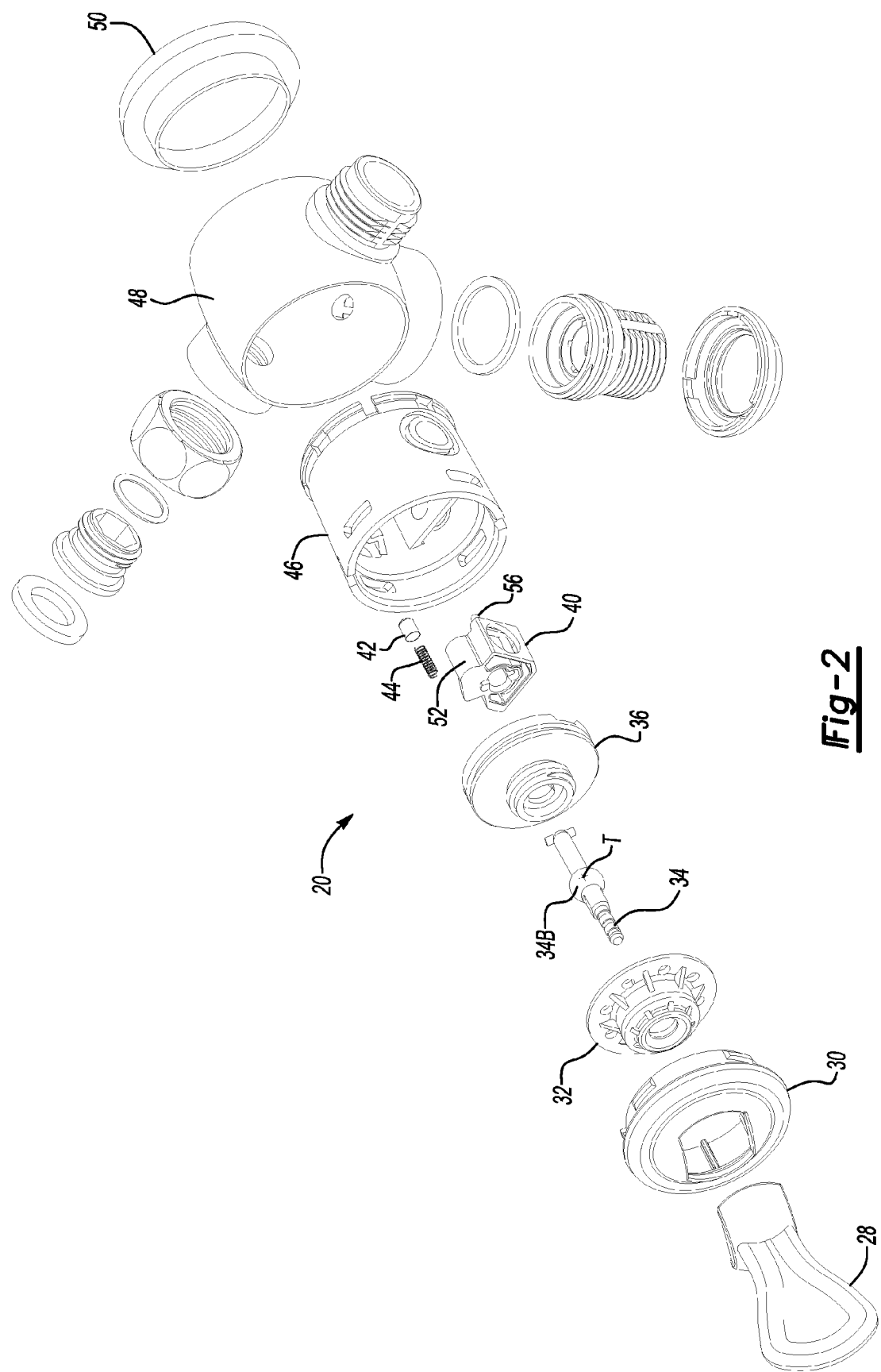
FIG. 2 is an exploded view of a diverter valve assembly according to one embodiment of the present invention.

Referring to FIG. 2, an exploded view of the diverter valve assembly 20 is illustrated. The diverter valve assembly 20 generally includes the handle 28, a housing front cover 30, a flange 32, a handle core 34, a fix plate 36, a rigid core 38, a resilient core 40, a detent 42, a spring 44, a valve body 46, a housing 48 and a housing back cover 50. The resilient core 40 is mounted within the rigid core 38 to define an effective seal surface within the valve body 46. The resilient core 40 may be manufactured of a resilient material such as rubber or other seal material while the rigid core 38 is manufactured of a relatively more rigid material such as a plastic or the like of which the over diverter valve assembly 20 components are manufactured.

The rigid core 38 with the resilient core 40 retained therein is movably retained within the valve body 46 by the fix plate 36. The fix plate 36 may be snapped with an interference fit, threaded or otherwise attached to the valve body 46. The handle core 34 is captured within the fix plate 36 by the flange 32. The flange 32 is snapped with an interference fit, threaded or otherwise attached to the fix plate 36. The flange 32, handle core 34 fix plate 36, rigid core 38/resilient core 40 as assembled to the valve body 46 provides a subassembly to be mounted within the housing 48 and enclosed therein by the housing front cover 30 and back cover 50.

The handle 28 is thereby pivotally retained within the housing front cover 30 to actuate the handle core 34. The handle 28 is mounted to the handle core 34 such that movement of the handle 28 pivots the handle core 34. The handle core 34 pivots relative the fix plate 36 about a ball section 34B which defines a pivot T of the handle core 34. The handle core 34 pivots about pivot T to slide the rigid core 38 within the valve body 46. The handle 28 and thus the handle core 38 is movable between a first position (FIGS. 3A-3C) and a second position (FIGS. 4A-4C) with an intermediate position (FIGS. 5A-5C) therebetween.

The rigid core 38 includes a detent pocket 52 which receives the detent 42 which is biased by the spring 44. The detent 42 is engageable with a series of recesses 54A, 54B, 54C (best seen in FIGS. 3B, 4B, and 5B) to further define the positions A, B and C. The rigid core 38 further includes a tab 56 which is engageable with a slot 58 defined within the valve body 46 (best seen in FIGS. 3A, B, C, 4A, B ,C, and 5A, B, C). The tab 56 on an end of the handle core 34 moves away from the straight surface 39 in the slot 58 as the resilient core (e.g., valve) 40 moves towards either of the first outlet 22 or the second outlet 24 from a neutral position in between the first outlet and the second outlet. (see FIGS. 3A, 4A, and 5A) The detent 42 engagement with the series of recesses 54A, 54B, 54C and the tab 56 engagement with the slot 58 facilitate movement control of the rigid core 38 within the valve body 46. The resilient core moves about the same distance as the distance that separates the first inlet 22 and the second inlet 24. The distance may vary depending on the type of seal placed on sealing faces 60, 62 on the resilient core 40. The tab 56 and the slot 58 form a joint that allows the tab 56 to slide within the slot as the resilient core 40 slides from the first outlet 22 to the second outlet 24 (See FIGS. 3A, 4A, 5A)

Figure 3A:
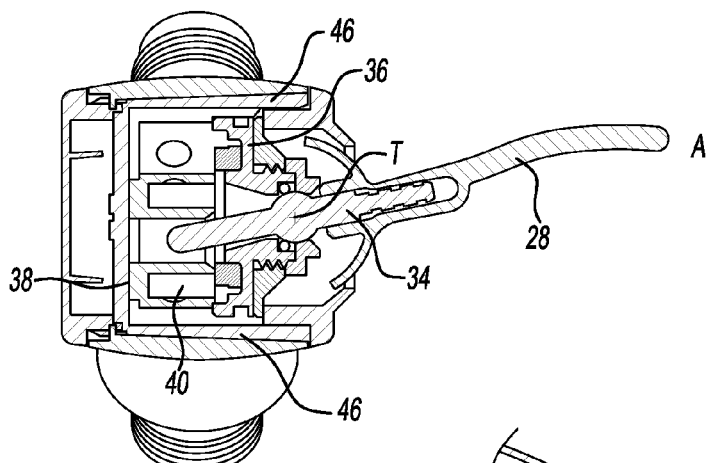
FIG. 3A is a side sectional view of the diverter valve assembly in the first position.
Figure 3B:
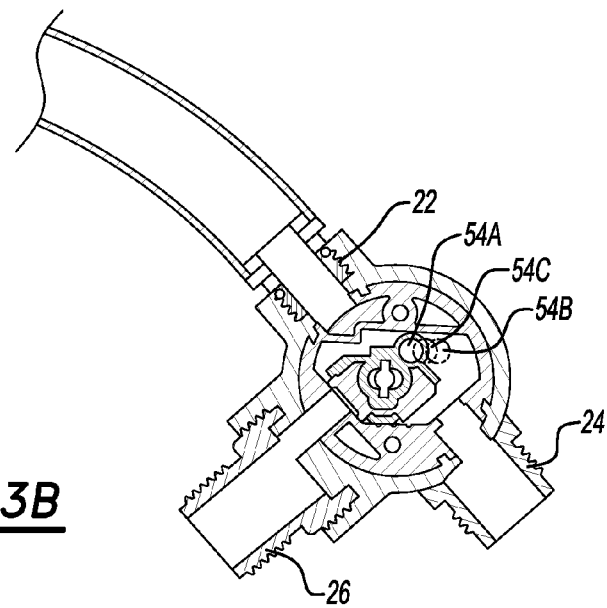
FIG. 3B is a top sectional view of the diverter valve assembly in the first position.
Figure 3C:
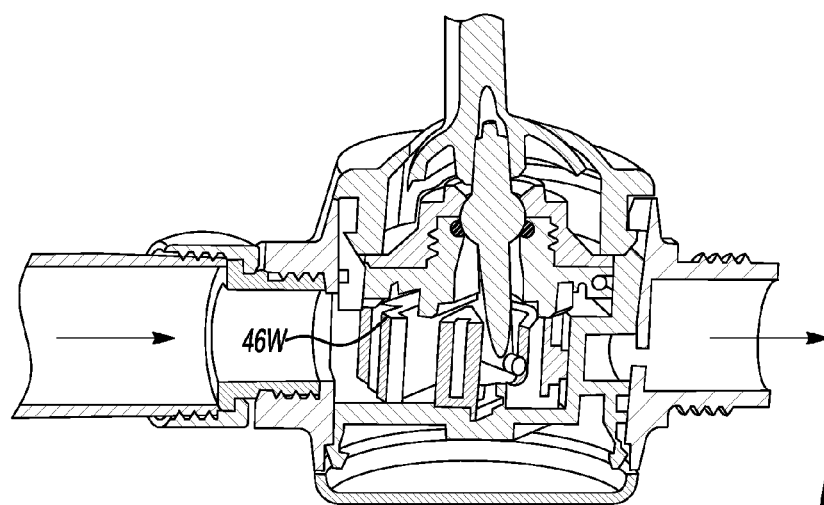
FIG. 3C is a transverse sectional view of the diverter valve assembly in the first position.

Referring to FIG. 3A, the first position A engages the resilient core 40 with the valve body 46 and blocks the second outlet 26 to divert a fluid from the inlet 22 to the first outlet 24. The rigid core 38 slides along straight surface 39 within slides within the valve body 46 such that the resilient core 40 essentially plugs a second valve body opening 46B (FIG. 3B). The fluid flows from the inlet 22 to pass between a wall 46W of the valve body 46 and the fix plate 36 (FIG. 3C).

Figure 4A:
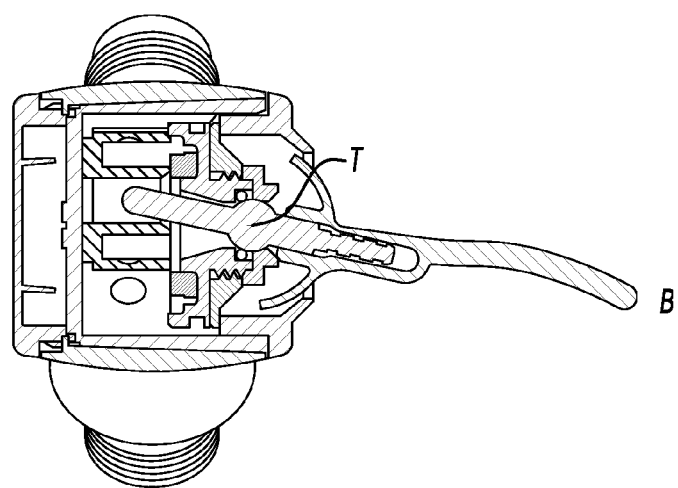
FIG. 4A is a side sectional view of the diverter valve assembly in the second position.
Figure 4B:
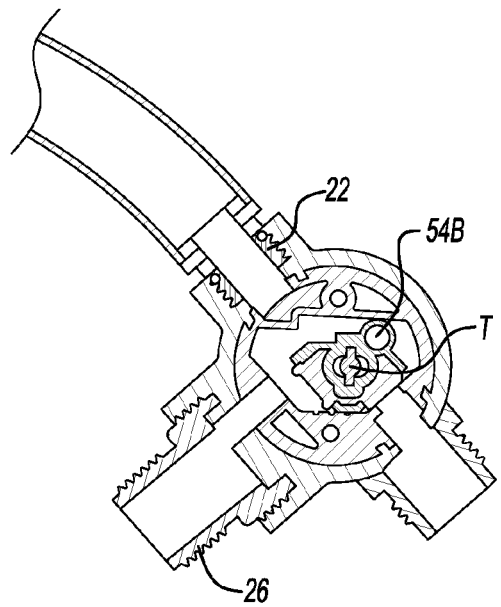
FIG. 4B is a top sectional view of the diverter valve assembly in the second position.
Figure 4C:
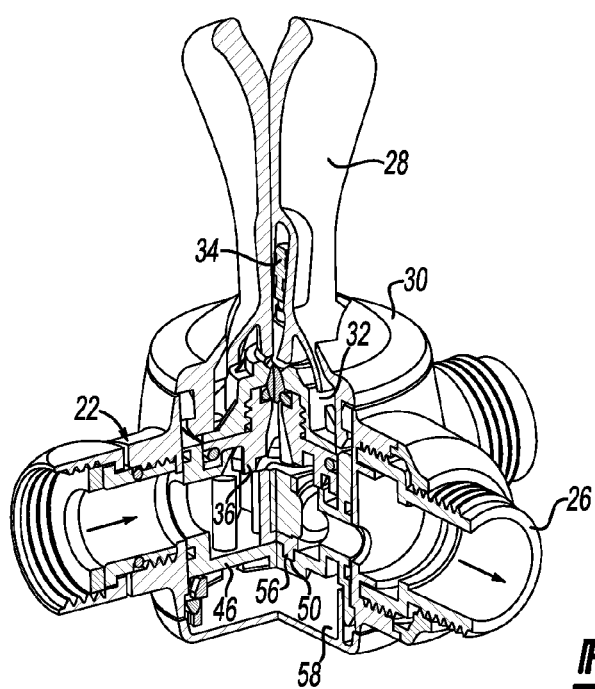
FIG. 4C is a transverse sectional view of the diverter valve assembly in the second position.

Referring to FIG. 4A, the second position B engages the resilient core 40 with the valve body 46 and block the first outlet 24 to divert fluid from the inlet 22 to the second outlet 26. The rigid core 38 slides slides along straight surface 39 within the within the valve body 46 such that the resilient core 40 essentially plugs a first valve body opening 46A (FIGS. 4B and 4C).

Figure 5A:
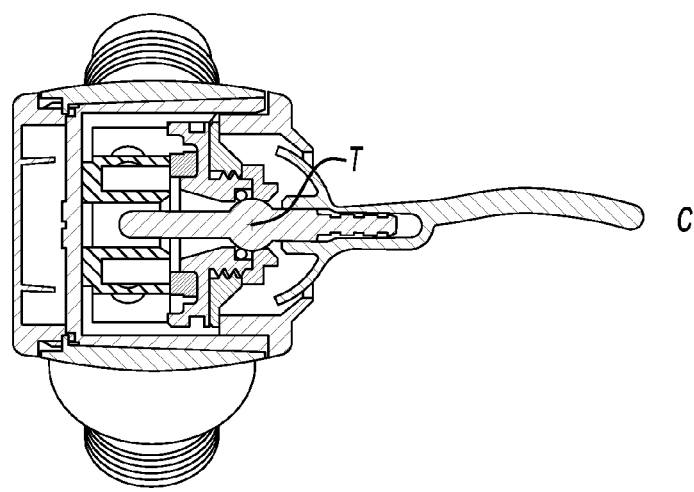
FIG. 5A is a side sectional view of the diverter valve assembly in the intermediate position.
Figure 5B:
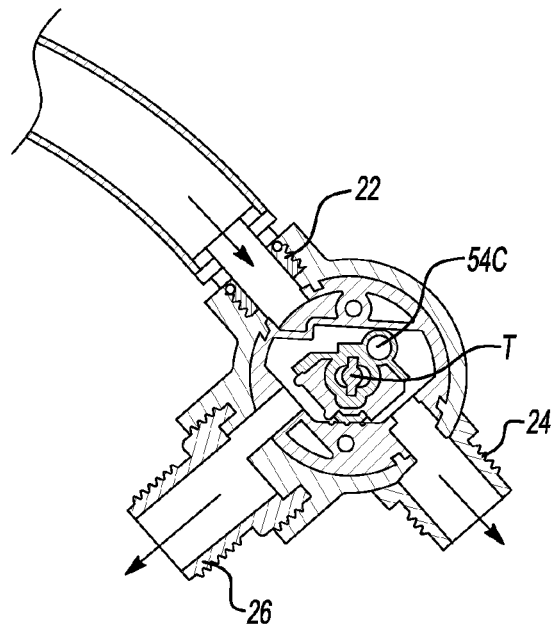
FIG. 5B is a top sectional view of the diverter valve assembly in the intermediate position.
Figure 5C:
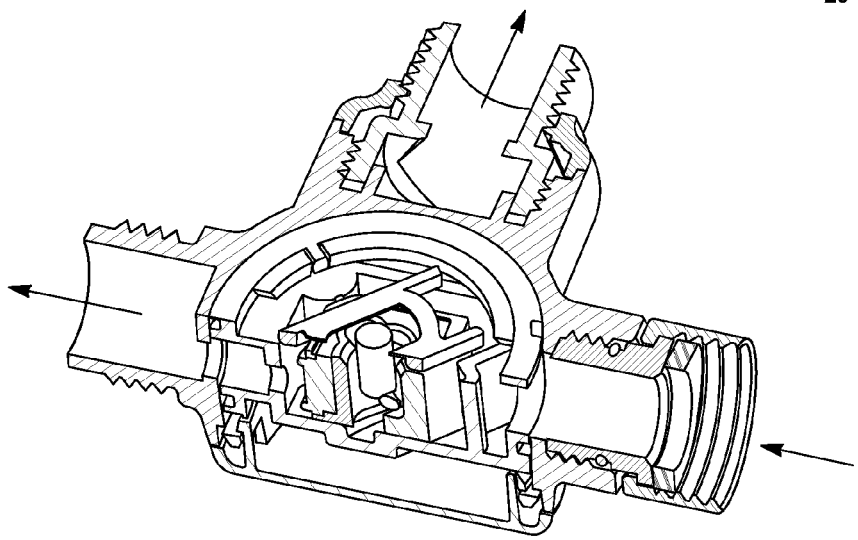
FIG. 5C is a transverse sectional view of the diverter valve assembly in the intermediate position.

Referring to FIG. 5A, an intermediate position C of the handle 28 and thus the handle core 38 permits fluid to flow the inlet 22 to both the first outlet 24 and the second outlet 26 (FIGS. 5B). The rigid core 38 is located within the valve body 46 such that the resilient core 40 plugs neither the first valve body opening 46A or the second valve body opening 46B (FIG. 5C). The inlet 22 and the outlet 24 are disposed at an angle $\alpha$ of about 90 degrees to each other. The sealing faces 60, 62 are disposed at the same angle $\alpha$ of about 90 degrees to each other (see FIG. 5B) so that the sealing faces 60, 62 are parallel to the inlet 22 and the outlet 24 if in sealing arrangement therewith (See FIGS. 3B and 4B.

It should be understood that like reference numerals identify corresponding or similar elements throughout the several drawings. It should also be understood that although a particular component arrangement is disclosed in the illustrated embodiment, other arrangements will benefit from the instant invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A diverter valve assembly comprising:
    a housing that defines an inlet, a first outlet and a second outlet, said first and second outlets being separated by a distance;
    a handle, wherien said handle extends from said housing that pivots about an axis such that an end thereof travels approximately said distance within said housing;
    a valve having a rigid core within said housing, said valve in fluid communication with said inlet and sliding approximately said distance to seal either of said first outlet or said second outlet, said valve having a first sealing surface for sealing said first outlet and a second sealing surface for sealing said second outlet;
    a joint between said valve and said end of said handle such that said valve slides in contact with a surface of said housing said distance between said first outlet and said second outlet as said handle pivots; and
    a detent wherein said detent is seated in a first hole of said rigid core when said valve body is disposed against said first outlet and in a second hole of said rigid core when said valve is disposed against said second outlet.

2. The assembly of claim 1 wherein said handle may travel an intermediate distance and said valve in contact with said handle and said surface may seal neither of said first outlet or said second outlet.

3. The assembly of claim 1 wherein said first outlet is disposed at an angle relative to said second outlet and said first sealing surface and said second sealing are disposed at said angle relative to each other.

4. The assembly of claim 3 wherein said first sealing surface and said first outlet are in parallel if said valve is disposed against said first outlet.

5. The assembly of claim 3 wherein said first sealing surface and said first outlet are in parallel when said valve is disposed against said first outlet and said second sealing surface and said second outlet are in parallel when said valve is disposed against said second outlet.

6. The assembly of claim 1 wherein said rigid core is movable within a fix plate, said fix plate being mounted to said body.

7. The assembly of claim 1 wherein said handle is movable about a pivot.

8. The assembly of claim 7 wherein said pivot is defined by a ball section.

9. The assembly of claim 1 further wherein said detent is seated in a third hole between said first hole and said second hole if said valve is not disposed against said first or second outlet.

10. The assembly of claim 1 wherein said end of said handle moves away from said surface as the valve moves towards said first outlet or said second outlet and moves towards said first outlet or said second outlet as the valve moves to position between said first outlet and said second outlet from said first outlet or said second outlet respectively.

11. The assembly of claim 1 wherein said joint is comprised on a tab on said handle sliding in a slot.

12. The assembly of claim 1 wherein said surface is planar.

13. The assembly of claim 1, wherein said assembly is further characterized by the inclusion of only a single detent.

14. Method of operating a diverter valve comprising the steps of:
    providing a housing that defines an inlet, a first outlet and a second outlet, said first and second outlets being separated by a distance;
    pivoting a handle extending from a body that pivots about an axis such that an end of said handle travels said distance within said housing;
    providing a joint between said end and a valve body, and sliding said valve body said distance and in contact with a housing surface to seal either of said first outlet or said second outlet, said valve body having a first sealing surface for sealing said first outlet and a second sealing surface for sealing said second outlet and shifting a detent such that the detent is seated in a first hole of a rigid core of the valve when said valve body is disposed against the first outlet and in a second hole of the rigid core when the valve is disposed against said second outlet.

* * * * *